United States Patent
Williamson et al.

[11] Patent Number: 5,970,706
[45] Date of Patent: Oct. 26, 1999

[54] AUTOMATIC CONTROL METHOD FOR CORONA DISCHARGE POLLUTANT DESTRUCTION

[75] Inventors: Weldon S. Williamson, Malibu; Franklin A. Dolezal, Reseda; Nelson W. Sorbo, Redondo Beach; John H. S. Wang, Rancho Palos Verdes, all of Calif.

[73] Assignee: Hughes Electronics Corporation, El Segundo, Calif.

[21] Appl. No.: 09/119,895

[22] Filed: Jul. 21, 1998

Related U.S. Application Data

[62] Division of application No. 08/689,999, Aug. 19, 1996.

[51] Int. Cl.$^6$ ........................................... F01N 3/00
[52] U.S. Cl. ............................. 60/274; 60/275; 60/276; 422/186.04
[58] Field of Search ............................. 60/274, 275, 276; 422/186.04, 186.07

[56] References Cited

U.S. PATENT DOCUMENTS

| | | |
|---|---|---|
| 3,526,081 | 9/1970 | Kusters . |
| 3,862,043 | 1/1975 | Haakenson . |
| 4,069,665 | 1/1978 | Bolasny . |
| 4,818,355 | 4/1989 | Kanter et al. .................. 422/186.04 |
| 5,061,462 | 10/1991 | Suzuki . |
| 5,199,257 | 4/1993 | Colletta et al. ..................... 60/275 |
| 5,236,672 | 8/1993 | Nunez et al. .................. 422/186.04 |
| 5,263,317 | 11/1993 | Watanabe et al. ..................... 60/275 |
| 5,366,701 | 11/1994 | Taylor . |

FOREIGN PATENT DOCUMENTS

| | | |
|---|---|---|
| 0585047 | 3/1994 | European Pat. Off. . |
| 0744802A2 | 11/1996 | European Pat. Off. . |

*Primary Examiner*—Thomas E. Denion
*Attorney, Agent, or Firm*—V. D. Duraiswamy; M. W. Sales

[57] ABSTRACT

In a pollutant destruction apparatus employing one or more corona discharge reactors, an automatic control system controls power generation characteristics for corona discharge reactions according to factors such as the types and the amounts of pollutants in an exhaust gas, maximum allowable emissions, engine operating characteristics, drive control characteristics and intelligent vehicle highway system inputs, to achieve improved treatment of the pollutants.

9 Claims, 3 Drawing Sheets

AUTOMATIC CONTROL METHOD FOR CORONA DISCHARGE POLLUTANT DESTRUCTION

This is a division of application Ser. No. 08/689,999 filed Aug. 19, 1996.

BACKGROUND OF THE INVENTION

1. Field of the Invention

This invention relates to an automatic control system and method for controlling corona discharge reactions in a corona discharge pollutant destruction apparatus employing one or more corona discharge reactors.

2. Description of the Related Art

Passing a pollutant bearing gas through a corona discharge site is a known method of removing the pollutants from the gas. A general review of this technique is provided in Puchkarev et al., "Toxic Gas Decomposition by Surface Discharge," *Proceedings of the* 1994 *International Conf. on Plasma Science,* June, 6–8, 1994, Santa Fe, N. Mex., paper No. 1E6, page 88. Corona pollutant destruction has also been proposed for liquids, as disclosed in application Ser. No. 08/295,959, filed Aug. 25, 1994, "Corona Source for Producing Corona Discharge and Fluid Waste Treatment with Corona Discharge," and assigned to Hughes Aircraft Company, now doing business as Hughes Electronics.

In one system, described in Yamamoto et al., "Decomposition of Volatile Organic Compounds by a Packed Bed Reactor and a Pulsed-Corona Plasma Reactor," *Non-Thermal Plasma Techniques for Pollution Control,* NATO ASI Series Vol. G*34* Part B, Ed. by B. M. Penetrante and S. E. Schultheis, Springer-Verlag Berlin Heidelberg, 1993, pages 87–89, brief high voltage pulses of about 120–130 nanoseconds duration are applied to the center conductor of a coaxial corona reactor through which gas is flowing. Each pulse produces a corona discharge that emanates from the center wire and floods the inside volume of the reactor with energetic electrons at about 510 keV. A similar system is described in U.S. Pat. No. 4,695,358, in which pulses of positive DC voltage are superimposed upon a DC bias voltage to generate a streamer corona for removing $SO_x$ and $NO_x$ from a gas stream. These processes have relatively poor energy efficiencies. With the reactor geometries that have been selected, it is necessary to deliver very short pulses to avoid arc breakdown between the electrodes, and consequent damage. The pulse-forming circuit loses approximately half of the power coming from a high voltage supply in a charging resistor, and additional energy is wasted in a double spark gap. Furthermore, the capacitive load of the coaxial corona reactor must be charged; this charging energy is typically much greater than the energy that is actually used in the corona reaction, and simply decays away into heat after each pulse without contributing to the pollutant destruction.

A similar approach, but with a different reactor geometry, is taken in Rosocha et al., "Treatment of Hazardous Organic Wastes Using Silent-Discharge Plasmas," *Non-Thermal Plasma Techniques for Pollution Control,* NATO ASI Series Vol. G34 Part B, Ed. by B. M. Penetrante and S. E. Schultheis, Springer-Verlag Berlin Heidelberg, 1993, pages 79–80, in which the corona discharge is established between parallel plates. This system also suffers from a poor specific energy due to inefficient pulse formation and non-recovery of reactor charging energy.

High voltage power pulses are very effective in destroying hydrocarbons (HC) and carbon monoxide (CO) in a corona discharge reactor, but do not facilitate the reduction of nitrogen oxides ($NO_x$) into diatomic nitrogen ($N_2$) and oxygen ($O_2$). Experiments have shown that using high voltages (up to 12 kV) may even produce some additional $NO_x$. On the other hand, low voltage pulses are highly efficient in reducing $NO_x$, but are very poor at oxidizing HC.

SUMMARY OF THE INVENTION

The present invention provides an automatic control system and method for controlling the characteristics of corona discharge reactions in a single-stage or multistage corona pollutant destruction reactor system by adjusting the power generation parameters including the voltage, resonator frequency, pulse width and pulse repetition rate of each power source that provides power for corona discharge in a respective reactor stage. The automatic control system comprises a computer that reads relevant input data from various sensors such as engine sensors and tailpipe sensors, from external inputs, and from internal memory. Based upon these data, the computer computes the desired power generation parameters for each of the power sources to minimize the outputs of pollutants such as HC, CO and $NO_x$. The computer sends the desired parameters to a control module which adjusts the power generation parameters of each power source according to the desired parameters.

In one embodiment, the computer reads data from an intelligent vehicle highway system (IVHS) for target concentrations of pollutants, compares them with pollutant concentrations sensed by the tailpipe sensors, and computes the power generation parameters necessary to keep the concentrations of pollutants discharged from the tailpipe within the limits of the target concentrations.

In another embodiment, additional exhaust gas sensors are placed in conduits connected between the reactor stages so that the effectiveness of treatment by each reactor stage can be monitored. The measurements are read by the computer to control the power sources' power generation parameters.

These and other features and advantages of the invention will be apparent to those skilled in the art from the following detailed description, taken together with the accompanying drawings, in which:

DETAILED DESCRIPTION OF THE INVENTION

Figure 1:
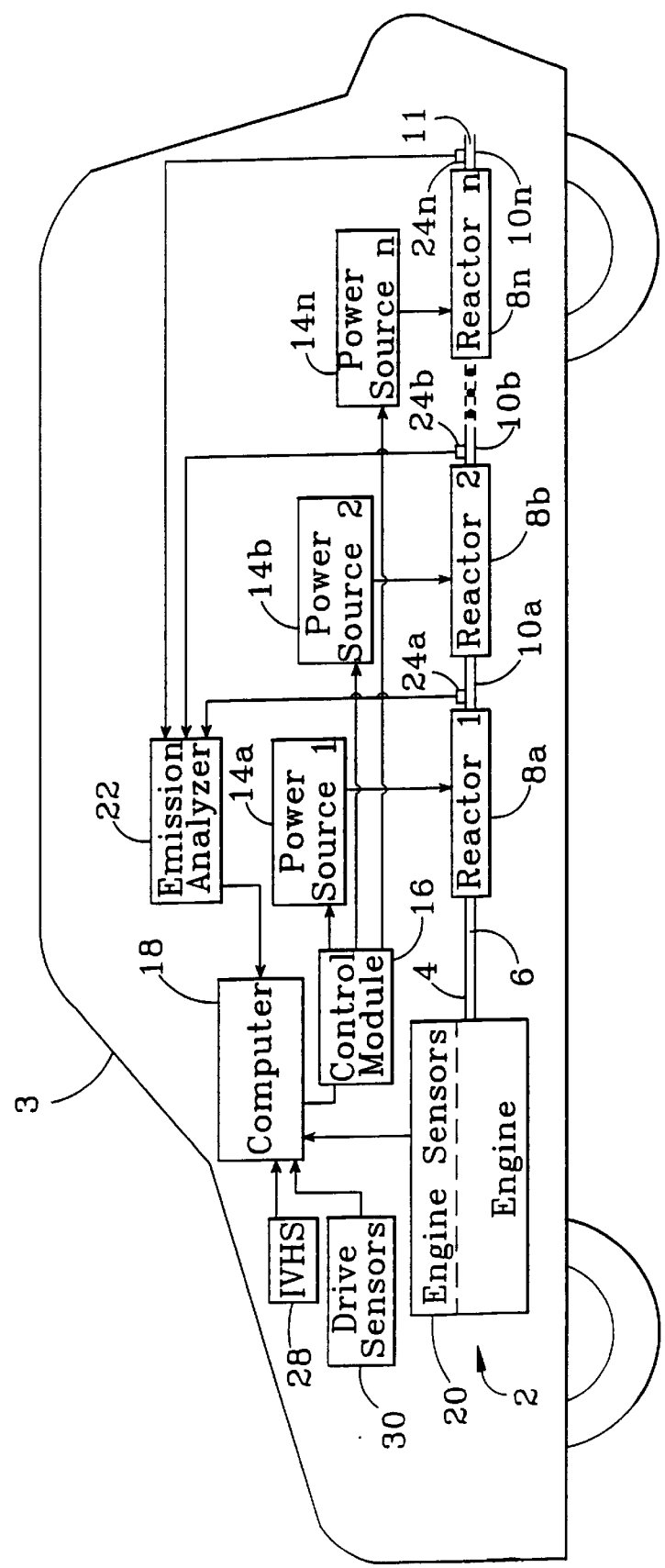
FIG. 1 is a block diagram of an automatic control system for a multi-stage corona discharge pollutant destruction reactor system.

The present invention provides an automatic control system for a pollutant destruction apparatus which employs corona discharge reactors. A preferred embodiment of which is shown in FIG. 1, an engine 2 within an automobile body 3 has an exhaust conduit 4 which carries exhaust gas 6 to a series of reactors 8*a*, 8*b*, . . . 8*n*, with an outlet conduit 10*a* from the first stage reactor 8*a* connected as an input to the second stage reactor 8*b*, the outlet conduit 10*b* from reactor 8*b* connected to the next stage, and so on until the final stage reactor 8n is reached. The treated exhaust gas 11 exits the final reactor through a tailpipe 10n. Corona discharges in the reactors 8a, 8b, . . . 8n are generated by high voltage pulses supplied by respective power sources 14a, 14b, . . . 14n.

In a preferred embodiment, some of the corona discharge reactors are dedicated to the oxidation of HC and CO and thus operate at relatively high power levels, while others are dedicated to the reduction of $NO_x$ and thus operate at relatively low power levels. The reactor stages may be arranged in such a way that an initial number of stages operate at high voltages to progressively destroy HC and CO, and the subsequent stages operate at lower voltages to progressively destroy $N_x$. The corona discharge energy in each reactor stage is determined by the power generation parameters that are precisely controlled by a computer to minimize the amount of HC, CO and $NO_x$ in the treated exhaust gas. In another arrangement of multi-stage corona discharge reactors, the oxidation of HC and CO and the reduction of $NO_x$ are achieved in alternate reactor stages. The odd-ordered stages operate at high voltages to destroy HC and CO, while the even-ordered stages operate at low voltages to destroy $NO_x$. Again, the power generation parameters are precisely controlled by a computer to minimize the amount of pollutants in the treated gas.

Although FIG. 1 shows a corona discharge pollution destruction apparatus with n reactor stages, this invention is also applicable to single-stage corona discharge reactors. Depending upon whether a particular reactor is designed for the oxidation of HC and CO or for the reduction of $NO_x$, and also upon the amount of each pollutant to be treated, different power generation parameters are required for each reactor. Oxidation reactors usually require higher corona discharge power than reduction reactors. The corona discharge power depends upon the voltage, resonator frequency, and duty cycle, which is defined as the product of pulse width and pulse repetition rate. In general, the operating voltage of an oxidation reactor is higher than that of a reduction reactor. The number of corona discharges per unit of time increases with increasing resonator frequency and duty cycle. The desired resonator frequency and duty cycle for oxidation reactors are usually higher than those for reduction reactors.

All power sources 14a, 14b, . . . 14n are controlled by a control module 16, which adjusts their power generation parameters under the control of a computer 18. The computer 18 receives data from one or more engine sensors 20, and from an emission analyzer 22 connected to one or more tailpipe exhaust gas sensors 24n that sense the concentration levels of the pollutants to be controlled. Each exhaust gas sensor 24n senses a particular type of pollutant. Preferably, the engine sensors 20 include an exhaust gas temperature sensor, an engine rotation rate sensor and pollutant sensors that are capable of measuring the concentrations of major pollutants, including HC, CO and $NO_x$. It is preferred that the engine sensors 20 further include an intake manifold pressure sensor, an oxygen concentration sensor and an altitude sensor. The emission analyzer 22 measures the concentrations of pollutants including HC, CO and $NO_x$ remaining in the treated exhaust gas 11. Based upon these data, the computer 18 computes the desired power generation parameters for each of the power sources 14a, 14b, . . . 14n to minimize the amount of pollutants in the treated exhaust gas 11, and sends the desired parameters to the control module 16.

In one embodiment, the computer 18 receives additional input data from a proposed intelligent vehicle highway system (IVHS) 28 and from one or more drive control sensors 30 to determine with better precision and more reliability the desired power generation parameters required for the power sources 14a, 14b, . . . 14n to generate corona discharge reactions in the respective reactors 8a, 8b, . . .8n. An IVHS is expected to monitor highway traffic and concentration levels of the pollutants in the atmosphere, and determine the maximum allowable emission of the pollutants for vehicles traveling on the highway. The IVHS would broadcast the emission requirement information that includes the target concentration levels of the pollutants to a vehicle that is equipped to receive such information. The information is delivered to the computer 18, which compares the IVHS emission requirements with the data received from the engine sensors 20, the drive sensors 30 and the emission analyzer 22 connected to the tailpipe exhaust gas sensors 24n, and computes the desired power generation parameters for each of the power sources 14a, 14b, . . . 14n to meet the emission requirements. The computer 18 then sends commands to the control module 16 to adjust the power generation parameters of the power sources 14a, 14b, . .14n according to the desired parameters.

The drive control sensors 30 preferably measure drive control characteristics such as throttle position, throttle-position history, braking, vehicle acceleration and slope of road incline or decline. The computer 18 reads these characteristics from the drive control sensors 30 and determines in real time any adjustments necessary to the power generation parameters to enhance the pollutant destruction in the reactors 8a, 8b, . . . 8n. For example, during hard acceleration or driving on a steep incline, the engine generates an increased amount of pollutants. The computer 18, upon receiving drive control sensor inputs, increases the power supplied by the power sources 14a, 14b, . . 14n to the reactors 8a, 8b, . . .8n to destroy the extra pollutants in the exhaust gas effectively. When the vehicle merely cruises, the computer 18 reduces the discharge power to reduce power consumption by the power sources 14a, 14b, . . .14n, thereby improving fuel economy.

In addition to providing one or more exhaust gas sensors 24n at the tailpipe, more exhaust gas sensors 24a, 24b, . . . may be placed in the reactor outlet conduits 10a, 10b, . . . to sense the chemical contents and concentration levels of the pollutants in the exhaust gas flowing out of each of the reactors. In this configuration, in which each reactor's effectiveness of treatment of a particular pollutant is known, each of the power sources 50a, 50b, . . . 50n can be controlled more precisely to optimize the treatment in each of the reactors 40a, 40b, . . . 40n. These exhaust gas sensors 24a, 24b, . . . are optional except for the final tailpipe exhaust gas sensor 24n, which is necessary to provide the computer 18 with sensor signals containing pollutant data for the treated exhaust gas 11.

Figure 2:
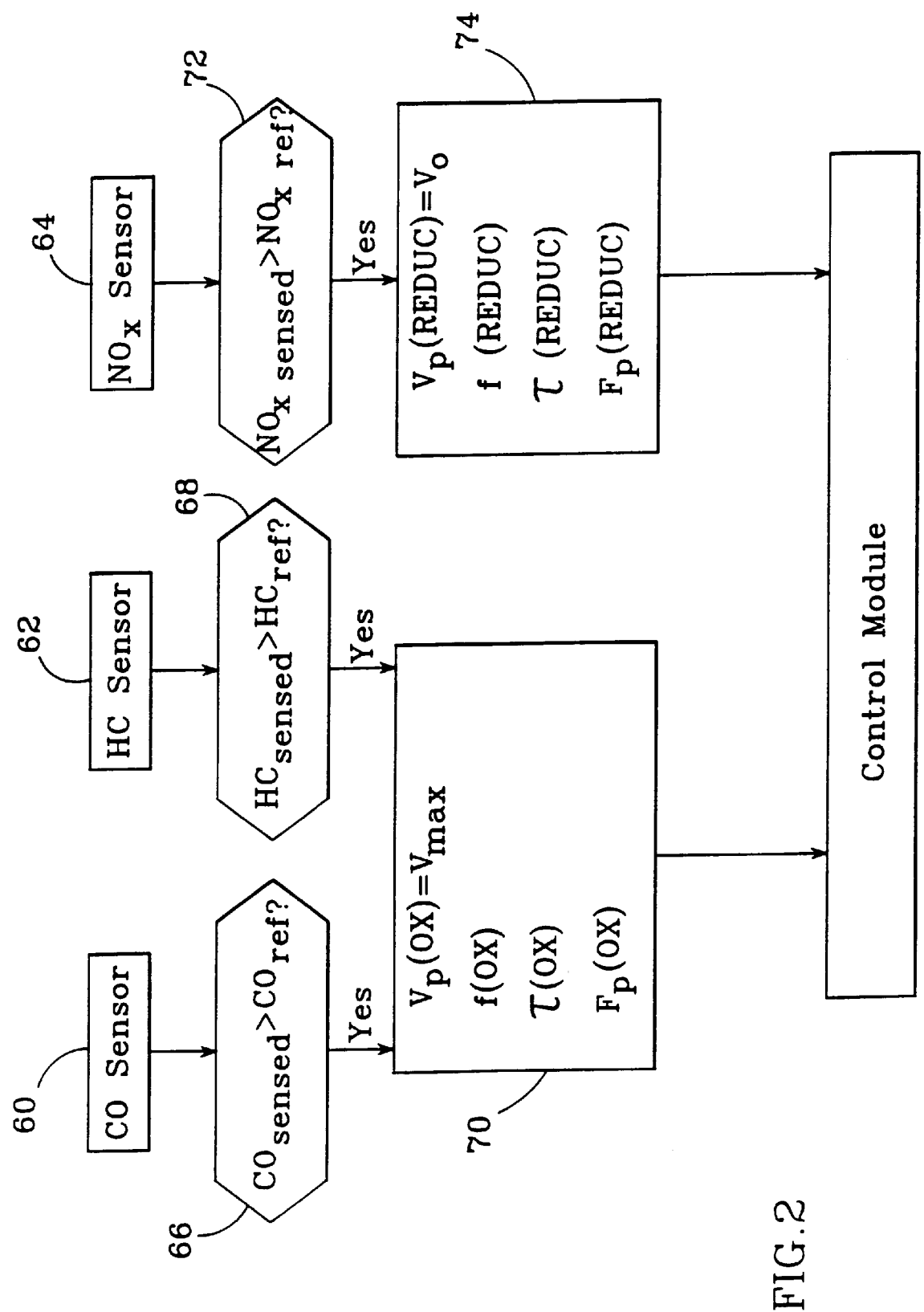
FIG. 2 is a flowchart illustrating a method for automatically controlling power sources to meet emission requirements.
Figure 3:
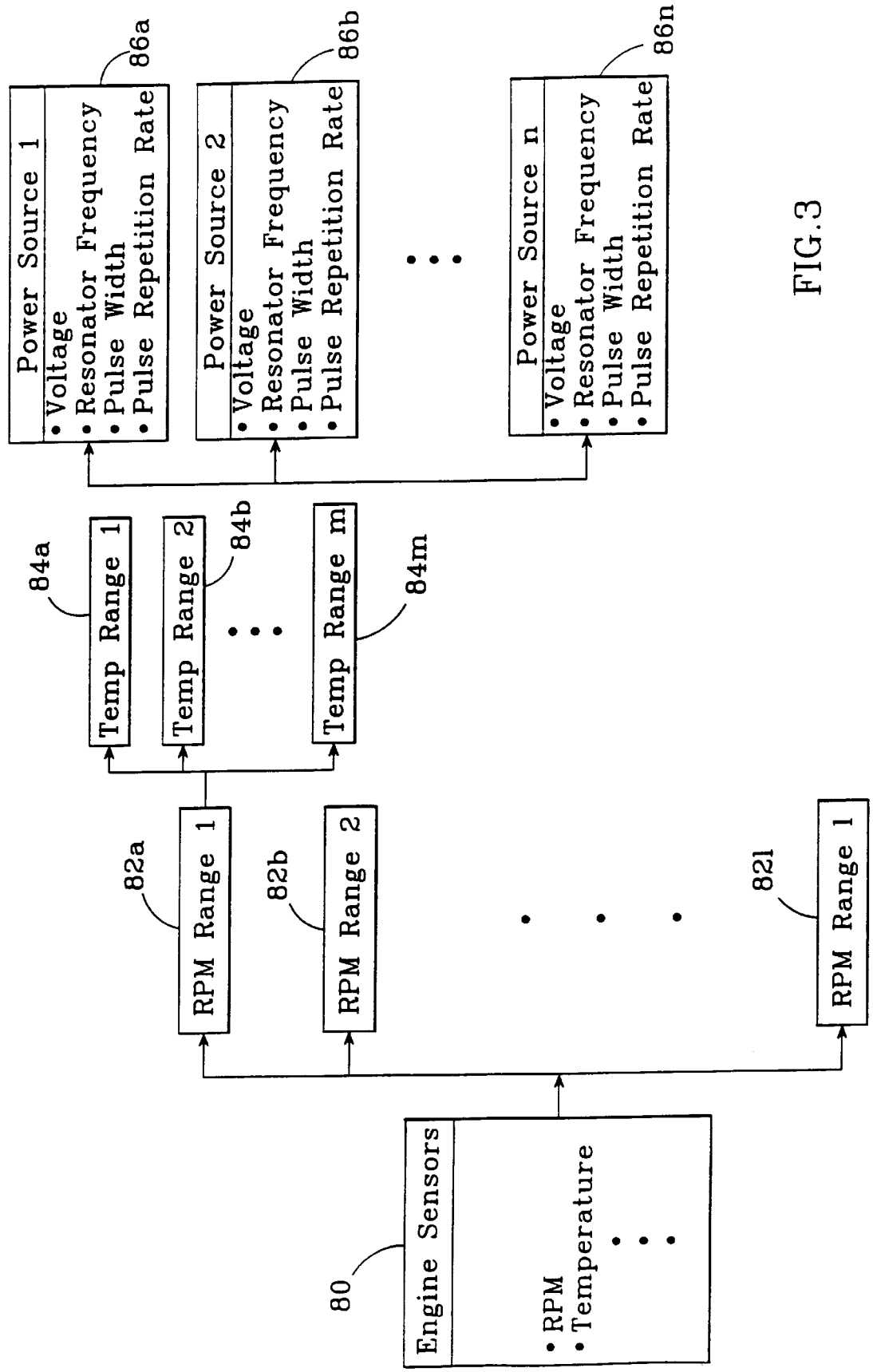
FIG. 3 is a flowchart illustrating a method for automatically controlling power sources based upon inputs from engine sensors.

Many control methods, two embodiments of which are illustrated in FIGS. 2 and 3, may be used for the automatic control system in this invention. FIG. 2 is a flowchart of a corona discharge power control scheme to meet maximum emission requirements for HC, CO and $NO_x$. It is a simple method that requires the control module to change the power generation parameters for the power sources only if the sensed amounts of at least one of the pollutants discharged from the pollutant destruction apparatus exceed the maximum emission requirements. This embodiment is well suited to a pollutant destruction apparatus having multiple stages of corona discharge reactors, some of which are dedicated to the oxidation of CO and HC and others are dedicated to the reduction of $NO_x$. In the embodiment shown in FIG. 2, the tailpipe sensors 24n of FIG. 1 comprise a CO sensor 60, an HC sensor 62 and a $NO_x$ sensor 64. The CO sensor 60 and the HC sensor 62 are placed in the tailpipe to measure the concentrations of CO and HC, respectively, in the emitted exhaust gas stream. "$CO_{ref}$" and "$HC_{ref}$" in blocks 64 and 66 are the maximum reference concentration levels allowed for the emission of CO and HC, respectively. The comparison operations in blocks 66 and 68 are performed in the computer 18, which compares the sensed concentration levels of CO and HC ($CO_{sensed}$ and $HC_{sensed}$) with their maximum allowable reference concentration levels $CO_{ref}$ and $HC_{ref}$. Preferably, the reference level for each type of pollutant is prestored in the computer's memory, such as by read only memory (ROM). If an IVHS is implemented, it is preferred that the computer receive the data for maximum allowable concentrations in real time from the IVHS. If the computer finds that $CO_{sensed}$ is greater than $CO_{ref}$, or that $HC_{sensed}$ is greater than $HC_{ref}$, it assigns a maximum voltage $V_{max}$ to the oxidation reactors' power source voltages $V_p(OX)$ to drive these reactors to maximum corona discharge in block 68. Other power generation parameters, including the resonator frequency $f(OX)$, pulse width $\tau(OX)$ and pulse repetition rate $F_p(OX)$, can also be adjusted for the oxidation reactors' power sources to increase the rate of oxidation in these reactors. In general, effective destruction of HC and CO requires high voltages on the order of about 10–15 kV. Assigning a maximum voltage to the oxidation reactors is a simple and effective method of increasing the effectiveness of destroying HC and CO in the oxidation reactors.

The $NO_x$ sensor 64 is also placed in the tailpipe to sense the emitted concentration of various $NO_x$ compounds. The sensed concentration level of $NO_x$ ($NO_{x\ sensed}$) is compared with its reference concentration level ($NO_{x\ ref}$) in block 72, which is a maximum allowable emission level that is either prestored in the computer's ROM or received from an IVHS in real time as described above. If $NO_{x\ sensed}$ is greater than $NO_{x\ ref}$, the computer assigns a voltage ($V_o$) that is desirable for the reduction of $NO_x$ to the reduction reactors' power source voltages $V_p(REDUC)$ to enhance the reduction of $NO_x$ in block 74. As in the case for oxidation reactors, other power generation parameters including the resonator frequency $f(REDUC)$, pulse width $\tau(REDUC)$ and pulse repetition rate $F_p(REDUC)$ can be adjusted for the reduction reactors' power sources. Since the desired power for the reduction of $NO_x$ is usually less than that for the oxidation of HC and CO, $V_o$ is generally less than $V_{max}$. The duty cycle, that is, $\tau(REDUC) \times F_p(REDUC)$ for the reduction reactors is generally less than the duty cycle $\tau(OX) \times F_p(OX)$ for the oxidation reactors. Nevertheless, the same method is valid for controlling the reduction reactors, power sources.

FIG. 3 shows another embodiment in which the computer utilizes inputs from the engine sensors 80. In this case, the engine sensors 80 include an engine rotations per minute (RPM) sensor and an engine temperature sensor. The whole range of engine rotation rates is divided into a series of ranges in blocks 82a, 82b, . . . 82l, so that any measured RPM from the engine sensors 80 can be assigned to one of the RPM ranges 82a, 82b, . . . 82l. Within each RPM range, the whole range of engine temperatures is divided into a series of ranges in blocks 84a, 84b, . . . 84m, so that any measured engine temperature from the engine sensors 80 can be assigned to one of the temperature ranges 84a, 84b, . . . 84m. When the engine operates within a particular RPM range and a particular temperature range, the computer determines the desired power generation parameters 86a, 86b, . . . 86n for each of the power sources. Although the relationships between the desired power generation parameters, the engine temperature and the engine RPM have not been precisely determined, the rate of pollutant generation in the engine is in some way related to its temperature and RPM. Because the desired power generation parameters depend upon the rate of pollutant generation, the method illustrated in FIG. 3 is applicable to controlling the power generation parameters for optimized treatment of the pollutants. The computer may compute the desired power generation parameters in real time, or simply take from its memory a prestored set of parameters for each of the power sources based upon a particular RPM range and a particular temperature range. Although FIG. 3 only shows a detailed tree branch structure for one temperature range 84a and one RPM range 82a, the same structure is applicable to the other temperature ranges 84b–84m and the other RPM ranges 82b–82l. If the engine sensors 80 also sense other parameters such as intake manifold pressure, oxygen concentration and altitude, the tree structure in FIG. 3 would be further branched to include the ranges of these parameters for determining the power sources' power generation parameters.

This invention is applicable to pollutant treatment at both stationary and mobile sites. The invention should be well suited for implementation in expected future automotive electronic catalytic converters which employ corona discharge pollutant destruction reactors to meet more stringent air quality standards. With the described dynamic control of corona discharge reactions in response to various inputs that have bearings on pollutant generation and destruction, this invention will enable an electronic catalytic converter to efficiently treat automobile exhaust gas pollutants to meet air quality standards while preserving fuel economy.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of reducing pollutants in an exhaust gas, comprising:

subjecting said exhaust gas to a first pulsed corona discharge at a discharge voltage and a pulse repetition rate in respective ranges suitable for oxidizing HC and CO pollutants in said exhaust gas, subjecting said exhaust gas to a second pulsed corona discharge at a discharge voltage and a pulse repetition rate in respective ranges suitable for reducing $NO_x$ in said exhaust gas, and dynamically and independently adjusting the respective pulse repetition rates of said first and second corona discharges to maintain the levels of HC, CO and $NO_x$ in said exhaust gas withing respective allowable limits.

2. The method of claim 1, wherein said HC, CO and $NO_x$ levels are determined by directly measuring the amounts of HC, CO and $NO_x$ in said exhaust gas.

3. The method of claim 2, wherein said HC, CO and $NO_x$ are sensed in said exhaust gas subsequent to said first and second corona discharges.

4. The method of claim 1, wherein said HC, CO and $NO_x$ are generated by an engine, and said HC, CO and $NO_x$ levels are determined in response to sensing operating characteristics of said engine.

5. The method of claim 4, wherein said engine's sensed operating characteristics comprise rate of rotation, temperature, intake pressure and/or oxygen concentration.

6. The method of claim 1, wherein said HC, CO and $NO_x$ are generated by an engine, and said HC, CO and $NO_x$ levels are determined in response to sensing drive control characteristics of said engine.

7. The method of claim 6, wherein said drive control characteristics comprise throttle position, throttle position history, braking, acceleration, slope of road incline and/or slope of road decline.

8. The method of claim 1, wherein said maximum allowable levels are provided by an intelligent vehicle highway system (IVHS).

9. The method of claim 2, wherein said levels of HC and CO are sensed in said exhaust gas subsequent to said first corona discharge, and said level of $NO_x$ is separately sensed in said exhaust gas subsequent to said second corona discharge.

* * * * *